Patented Nov. 26, 1946

2,411,773

UNITED STATES PATENT OFFICE 2,411,773

CURING NEOPRENE

Byron W. Bender, Cupsaw Lake, N. J., assignor to United States Rubber Company, New York, N. Y., a corporation of New Jersey No Drawing. Application April 5, 1945, Serial No. 586,817

2 Claims. (Cl. 260—92.7)

This invention relates to improvements in curing neoprene (polychloroprene).

I have found that the curing rate of neoprene may be increased by incorporating with it, prior to cure, a small amount of a 3,3,3',3'-tetraalkyl-1,1'-spirobisindane-5,5',6,6'-tetrol, as an accelerator of the cure. It is used preferably in conjunction with a curing agent such as a metal oxide, known for the purpose, e. g., zinc oxide, magnesium oxide, litharge, etc.

My accelerator avoids the disadvantages of accelerators such as catechol, resorcinol, and hydroquinone, which are water-soluble and cause undesirable discoloration of the polychloroprene stock.

An accelerator of the class above referred to may be prepared by reacting 3 mols of acetone with 2 mols of catechol, and by a method such as stated by Baker & McGowan, Journal Chemical Society (1938), pages 347–353.

The proportion of the accelerator may be varied; generally useful proportions, by weight, based on the weight of the neoprene, range from 0.1% to 2%.

The accelerator may be used for accelerating the cure of any form of polychloroprene, milled or reclaimed, in solution, or in dispersion. The accelerator is particularly useful in latex products (those derived directly from a dispersion containing the neoprene) in which a quick cure and high modulus are desired, e. g., latex sponge, thread, dipped goods, latex treated fabrics, etc.

The following examples illustrate the invention, the parts being by weight:

TABLE I

*Mill mixed polychloroprene*

|  | A | B |
|---|---|---|
| Polychloroprene ("type E") | 100 | 100 |
| Zinc oxide | 10 | 10 |
| Magnesium oxide | 10 | 10 |
| Soft carbon black | 10 | 10 |
| Wood rosin | 72 | 72 |
| Phenyl-beta-naphthylamine | 5 | 5 |
| 3,3,3',3'-tetramethyl-1,1'-spirobisindane-5,5',6,6'-tetrol | 2 | 2 |
|  |  | 1 |

*Tests on press-cured slabs*

| Minutes of cure | A | | B | |
|---|---|---|---|---|
|  | Tensile | Elongation at break | Tensile | Elongation at break |
|  | P. s. i. | Per cent | P. s. i. | Per cent |
| 7 at 60# | 1,900 | 350 | 1,700 | 260 |
| 15 | 1,800 | 320 | 1,800 | 280 |
| 30 | 1,800 | 300 | 1,800 | 250 |

The faster rate of cure of compound B containing my accelerator is shown by its lower elongation, signifying higher modulus.

TABLE II

*Polychloroprene latex*

[(a) Without zinc oxide]

|  | C | D |
|---|---|---|
| Neoprene latex ("Type 571") solids | 100 | 100 |
| Dimethylamine oleate | 1.0 | 1.0 |
| Sodium alginate | 0.1 | 0.1 |
| 3,3,3',3'-tetramethyl-1,1'-spirobisindane-5,5',6,6'-tetrol |  | 1.0 |
| Total solids per cent | 48 | 48 |

*Tests on films*

| Time of cure in minutes | Modulus | | Tensile | Elongation | Modulus | | Tensile | Elongation at break |
|---|---|---|---|---|---|---|---|---|
|  | 300% | 500% |  |  | 300% | 500% |  |  |
|  |  |  | P. s. i. | Per cent |  |  | P. s. i. | Per cent |
| 60 at 160° F. plus 30 at 250° F | 90 | 160 | 850 | 1,160 | 90 | 170 | 1,300 | 1,130 |
|  | 100 | 100 | 2,100 | 1,140 | 90 | 180 | 2,100 | 1,080 |
| 60 | 90 | 90 | 2,500 | 1,180 | 80 | 160 | 1,900 | 1,030 |
| 120 | 110 | 110 | 2,600 | 1,140 | 90 | 170 | 2,200 | 1,040 |

[(b) With zinc oxide]

| | E | F |
|---|---|---|
| Polychloroprene latex ("Type 571") solids | 100 | 100 |
| Dimethylamine oleate | 1.0 | 1.0 |
| Sodium alginate | 0.1 | 0.1 |
| Zinc oxide | 5.0 | 5.0 |
| 3,3,3',3'-tetramethyl-1,1'-spirobisindane-5,5',6,6'-tetrol | ---- | 1.0 |
| Total solids_____per cent | 48 | 48 |

Tests on films

| Minutes of cure | Modulus 300% | Modulus 500% | Tensile | Elongation at break | Modulus 300% | Modulus 500% | Tensile | Elongation at break |
|---|---|---|---|---|---|---|---|---|
| | | | P. s. i. | Per cent | | | P. s. i. | Per cent |
| 60 at 160° F. plus | 100 | 160 | 1,400 | 1,140 | 210 | 300 | 1,900 | 930 |
| 30 at 250° F | 110 | 180 | 2,300 | 1,030 | 280 | 380 | 2,600 | 780 |
| 60 | 250 | 330 | 2,500 | 820 | 380 | 460 | 2,500 | 640 |
| 120 | 360 | 400 | 2,300 | 710 | 480 | 630 | 2,500 | 600 |

Dimethylamine oleate was added as 10% solution.

Sodium alginate was added as 2% solution.

The test films were poured on glass plates and air-dried 16 hours at 70° F., then heated for one hour at 160° F., then further cured by heating for various periods at 250° F., as indicated.

It may be seen from the above data for compounds C and D that in the absence of zinc oxide my accelerator has only a very slight effect on modulus and breaking elongations and films from both of these compounds have low modulus and high breaking elongation. However, in the presence of zinc oxide, the data for compounds E and F show that my accelerator has a marked accelerating influence and causes appreciable rise in modulus and decrease in breaking elongation for a given time of cure. Thus, to obtain the highest modulus stock, the use of both zinc oxide and my accelerator is indicated.

The test data show that the above tetrol is a very effective accelerator in both milled and latex forms of polychloroprene. As a matter of fact, it must be used with caution in milled stocks to avoid scorching and precuring of the stock before molding. In this respect, its action may be compared to that of the so-called ultra accelerators in rubber. Because of this tendency to scorch milled stocks, it will be of the greatest value in polychloroprene latex, just as the rubber "ultra" accelerators may be used more safely in latex than in milled stocks.

Having thus described my invention, what I claim and desire to protect by Letters Patent is:

1. A method of accelerating the cure of polychloroprene which comprises incorporating therein, prior to cure, a small amount of 3,3,3',3'-tetramethyl-1,1'-spirobisindane-5,5',6,6'-tetrol.

2. A method of accelerating the cure of polychloroprene which comprises incorporating therein, prior to cure, a small amount of 3,3,3',3'-tetramethyl-1,1'-spirobisindane-5,5',6,6'-tetrol, and zinc oxide.

BYRON W. BENDER.